(12) United States Patent
Kim

(10) Patent No.: US 7,915,859 B2  
(45) Date of Patent: Mar. 29, 2011

(54) APPARATUS AND METHOD FOR CONTROLLING POWER

(75) Inventor: Hong Ju Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 12/208,158

(22) Filed: Sep. 10, 2008

(65) Prior Publication Data

US 2009/0278497 A1  Nov. 12, 2009

(30) Foreign Application Priority Data

May 7, 2008 (KR) .......................... 10-2008-0042146  
Jul. 22, 2008 (KR) .......................... 10-2008-0071358

(51) Int. Cl.  
*H02J 7/00* (2006.01)

(52) U.S. Cl. .................... 320/126; 320/134; 429/160

(58) Field of Classification Search .................. 320/119, 320/126; 429/158  
See application file for complete search history.

(56) References Cited

U.S. PATENT DOCUMENTS

| | | | |
|---|---|---|---|
| 3,956,638 A * | 5/1976 | Ahrens et al. | 320/112 |
| 4,502,000 A * | 2/1985 | Mashikian | 320/122 |
| 4,502,001 A * | 2/1985 | Galloway | 320/122 |
| 5,652,499 A * | 7/1997 | Morita et al. | 320/112 |
| 5,993,992 A * | 11/1999 | Field et al. | 429/158 |
| 6,204,633 B1 * | 3/2001 | Kitagawa | 320/128 |
| 6,291,972 B1 * | 9/2001 | Zhang | 320/118 |
| 7,610,498 B2 * | 10/2009 | Sutardja | 713/320 |
| 2006/0271701 A1 * | 11/2006 | Sutardja | 709/238 |

FOREIGN PATENT DOCUMENTS

| | | |
|---|---|---|
| JP | 07-143677 A | 6/1995 |
| KR | 20-0189819 Y1 | 5/2000 |
| KR | 1020010009089 A | 2/2001 |

* cited by examiner

*Primary Examiner* — Edward Tso  
*Assistant Examiner* — Ramy Ramadan  
(74) *Attorney, Agent, or Firm* — Birch, Stewart, Kolasch & Birch, LLP

(57) ABSTRACT

An apparatus for controlling a power source, and which includes a power source unit including a plurality of power cells connected in parallel, a balancing unit coupled to the plurality of power cells of the power source unit, and a controller configured to control the balancing unit to balance operational characteristics of the plurality of power cells.

20 Claims, 7 Drawing Sheets

APPARATUS AND METHOD FOR CONTROLLING POWER

CROSS-REFERENCE TO RELATED APPLICATION

This application is related to, and claims priority to, Korean Patent Application No. 10-2008-42146, filed on May 7, 2008, and 10-2008-71358, filed on Jul. 22, 2008 the entire contents of which are hereby incorporated by references.

DISCUSSION OF THE BACKGROUND

1. Field of the Invention

The present disclosure relates to an electric power controlling apparatus having a control unit that controls input/output information of each electric power source in a state where a plurality of electric power sources are connected in parallel and a method for controlling the electric power.

2. Description of the Related Art

FIG. 1 is a block diagram of a prior art system using a power source.

As shown in FIG. 1, a system includes a central process unit (CPU) 14, a power source 10, and a display unit such as a liquid crystal display (LCD) device 16, and a sub-control unit such as a microcomputer 15 that is coupled to the power source 10 and the LCD device 16 to control data or signals.

The power source 10 includes a charger 13 capable of charging an alternative current power source 11 and sub-power sources such as cells 13a.

Meanwhile, in FIG. 1, the cell 13a that is the sub-power source is exemplarily integrated in the charger 13 to illustrate that the cell 13a is charged in or through the charger 13. However, the cell 13a may be provided independent from the charge.

FIG. 2 is a block diagram of a power source unit 100 having a plurality of cells that are connected in parallel and applying electric power to a system.

As shown in FIG. 2, a plurality of cells 21 and 22 are connected in parallel. A system 25 is driven by the cells 21 and 22. A protecting unit 24 is coupled to the cells 21 and 22 and the system to protect them. A charging/discharging switch 23 is provided to charge and discharge the cells 21 and 22.

In the above-described structure, only one cell having a large capacity or two or more cells that are connected in parallel are used to increase an operation time of the sub-power source in the system (e.g., a portable electronic device).

When two or more cells are connected in parallel to increase the operation time, currents applied to the respective cells may be different due to an impedance difference during charging or discharging.

That is, as the end of the discharging, one of the cells has a large discharging current to operate the protecting unit 24 and another cell is in a state where the discharging is finished.

In addition, due to the difficulty in an impedance matching in the cells and a loop path difference of the cells that are connected in parallel, some cells may be functionally deteriorated.

Further, when there is a short circuit in a specific cell in a state where the cells are connected in parallel, a relatively large current is concentrated. This may cause the explosion and fire of the system.

Even when only one of the cells that are connected in parallel malfunctions, all of the cells cannot be used.

In order to solve the limitations, the protecting unit 24 such as a positive temperature coefficient (PTC), a temperature compensation circuit, or an additional circuit is necessary for each of the cells.

Accordingly, it is not recommended to use the cells that are connected in parallel due to the additional use of the protecting units.

SUMMARY OF THE INVENTION

Embodiments provide a power control apparatus that can solve an unbalance problem between charging/discharging currents of respective power sources (cells) and a method for controlling the power.

Embodiments also provide a power control apparatus that is designed to match impedances of respective power sources with each other to solve an unbalance problem between charging/discharging currents of the respective power sources that are connected in parallel and a method for controlling the power.

Embodiments also provide a power control apparatus that is designed to couple a current balancing component such as a variable resistor to each of power sources to control a balance between charging/discharging currents of the respective power sources and a method for controlling the power.

Embodiments also provide a power control apparatus that is designed to match total impedances (an internal impedance of each power source+an external impedance by a variable resistor) of respective power sources with the respective power sources regardless of internal properties of each power source by directly coupling current balancing components such as the variable resistors that are control units to the respective power sources so that charging currents and/or discharging currents of the respective power sources that are connected in parallel are balanced with each other, and a method of controlling the power.

Embodiments also provide a power control apparatus that is designed such that charging currents and/or discharging currents of respective power sources that are connected in parallel are balanced with each other through a control using a current balancing component such as a pulse-width modulation (PWM) control to solve an unbalance problem between the currents of the respective power sources.

As an embodiment for controlling the PWM control, switches for a PWM control are connected to the respective cells in series as an example of the current balancing components. An on/off duration time of each switch is controlled in accordance with an identification result of an amount of the charging/discharging currents of the respective cells or impedances of the respective cells by a controller so as to control duty cycles (100%, 87.5%, and 77.7%) of the PWM, thereby making the charging/discharging currents of the respective cell be balanced.

Embodiments also provide an apparatus and method for controlling power which can perform a charging operation, a discharging operation, and a protecting operation for each of the cells using one charger coupled to the cells and a protector 34 and controls such that a predetermined charging/discharging current flows in each of the cells by controlling variable resistors or PWM duty switches that are current balancing components (CBC) that are connected to the respective cells in series in accordance with a monitoring result of charging/discharging currents for the respective cells (or impedance of each cell) by a microcomputer 37 that is a controller.

In one embodiment, an apparatus for controlling power includes a power source unit having a plurality of cells that are connected in parallel and at least one of which is capable of being charged and discharged; a current balancing unit coupled to the cells of the power source unit; and a controller for controlling the current balancing unit in accordance with an identification result of a state of the power source unit or at least one of currents of the respective cells.

In another embodiment, a method for controlling power includes identifying currents or impedances of cells of a power source unit that are connected in parallel; controlling current balancing components connected to the cells in accordance with the identification result; and charging the cells through the controlled current balancing components.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Reference will now be made in detail to the embodiments of the present disclosure, examples of which are illustrated in the accompanying drawings.

In the following description, terms are selected from general terms that are widely being used. Some of the terms are arbitrarily made by the applicant but operations and meanings thereof are described in the description in detail. Therefore, the terms must not be regarded as simple terms but as operations/meanings thereof.

For example, a current balancing component is a unit for controlling a current input to or output from a power source. For example, a current balancing component may be a variable resistor or a unit for a PWM control. However, the present disclosure is not limited to this configuration. That is, other units for impedance matching between power sources or for a balance between the power sources may be used as the current balancing component.

Further, in the present disclosure, although a control of the current or impedance (including resistance) is described, addition of unit for controlling a voltage of the power source based on the general current-voltage formula ($V=IR$) may be regarded as a unit for realizing a same purpose and solution.

In addition, a cell means a power source that can be charged and discharged.

Figure 1:
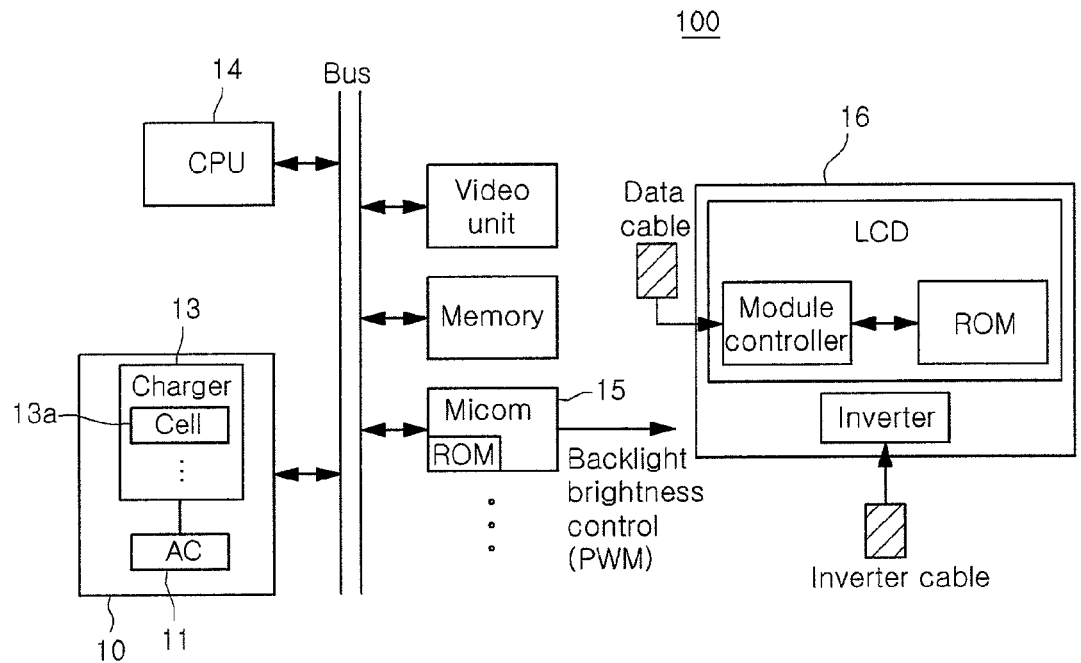
FIG. 1 is a block diagram of a prior art system using a power source.
Figure 2:
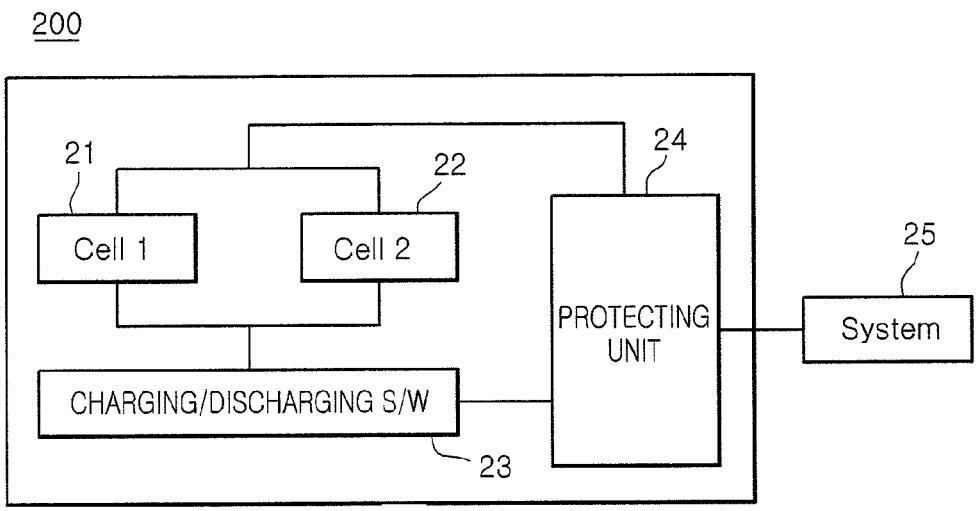
FIG. 2 is a block diagram of a power source unit 100 having a plurality of cells that are connected in parallel and applying electric power to a system.

An apparatus and method for controlling power in accordance with the present disclosure individually performs a charging operation, a discharging operation, and a protecting operation for each of the cells using one charger (not shown but see FIG. 1) coupled to the cells and a protector 34 and controls such that a predetermined charging/discharging current flows in each of the cells by controlling variable resistors (36 in FIG. 3) or PWM duty switches (64 in FIG. 6) that are connected to the respective cells in series in accordance with a monitoring result of charging/discharging currents for the cells (or impedance of each cell) by a microcomputer 37 that is a controller.

A feature of the present disclosure, in which, when a system includes a plurality of cells 31, for example, six cells and all of the six cells malfunction, a main switch (38 of FIG. 3) connected to the cells is turned off to be completely separated from the system 35, will be described in detail with reference to the accompanying drawings.

Figure 3:
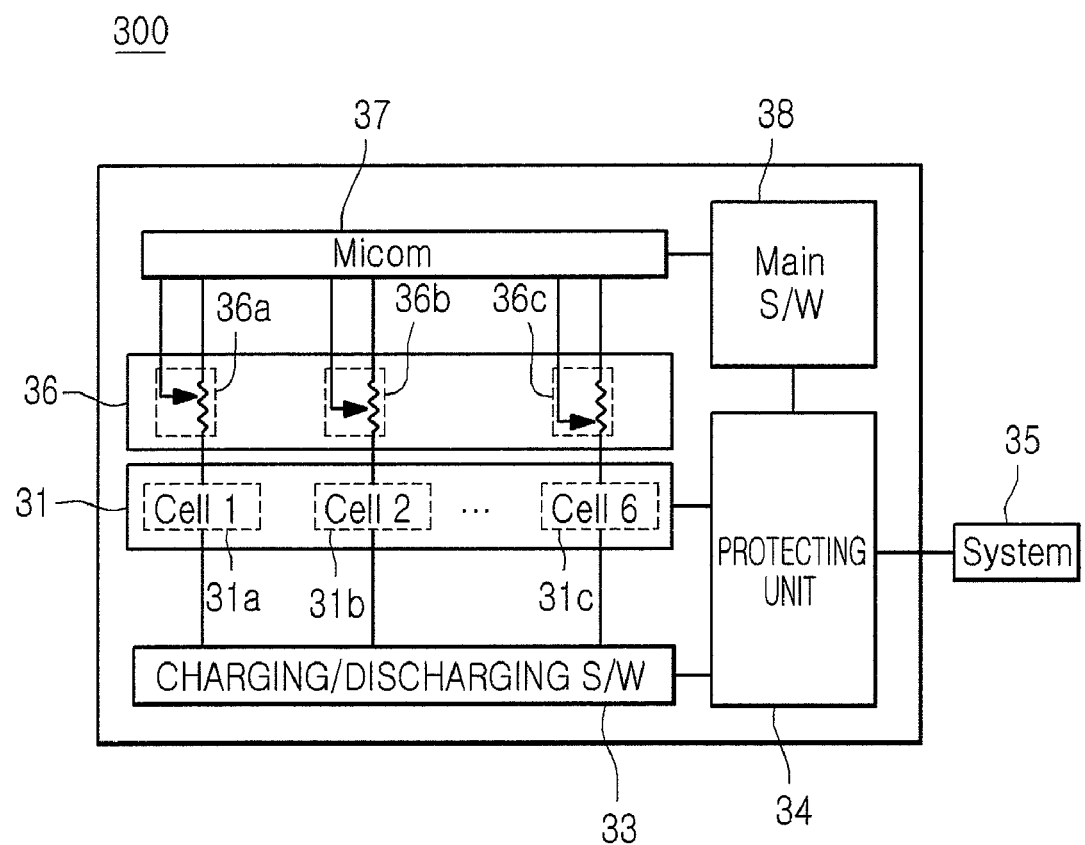
FIG. 3 is a block diagram illustrating an apparatus and method for controlling power according to an embodiment.

FIG. 3 is a block diagram 300 illustrating an apparatus and method for controlling power according to an embodiment.

As shown in FIG. 3, a power control apparatus includes a power source unit having a plurality of cells 31a, 31b, and 31c that can be charged and discharged and are connected in parallel, a current balancing unit 36 having a plurality of current balancing components (variable resistors) 36a, 36b, and 36c that are coupled to the respective cells 31a, 31b, and 31c, and a controller 37 for controlling an on/off of the cells 31a, 31b, and 31c or controlling the current balancing components 36a, 36b, and 36c of the current balancing unit 36 in accordance with a state of the power source unit 31 or a checking result of at least one of charging and current currents of the power sources 31a, 31b, and 31c. The apparatus further includes a charging/discharging switch for performing a charging/discharging on/off of the cells.

In the above-described structure, the cells 31a, 31b, and 31c of the power source unit are connected in parallel and the current balancing components 36a, 36b, and 36c are connected to the respective cells 31a, 31b, and 31c in series.

In this embodiment, the current balancing components 36a, 36b, and 36c may be variable resistors for variably controlling the charging/discharging current of each cell.

The controller 37 controls the current balancing unit 36 to realize a balance between charging currents and/or discharging currents of the respective cells 31a, 31b, and 31c of the power source unit 31.

The controller 37 controls the current balancing components 36a, 36b, and 36c of the current balancing unit 36 so that the impedances of the cells 31a, 31b, and 31c of the power source unit 31 match with each other regardless of internal/external properties of the respective cells 31a, 31b, and 31c of the power source unit 31.

The impedance considered for the application and/or matching for the cells of the power source unit are sum of an internal impedance of each cell and an external impedance by the corresponding variable resistor of the current balancing unit.

The controller controls the current balancing components coupled to the respective cells of the power source unit considering the inner/external properties of the power source unit so that the impedances of the respective cells can match with each other.

In the above-described structure, the microcomputer that is the controller controls the current balancing components in accordance with a monitoring result of the impedances or/and the charging/discharging currents of the respective cells so that the impedances of the respective cells can match with each other.

According to the method for monitoring and controlling the impedances by the microcomputer, when the impedance of each cell varies, the charging currents or discharging currents of the cells during the charge and discharge become different from each other. In this case, the microcomputer controls the variable resistors that are the current balancing components so that the charging currents or discharging currents become identical to each other.

Accordingly, it becomes possible to use the cells that are connected in parallel and the PTC and temperature compensation circuit may be selectively omitted. Therefore, the production cost can be reduced.

Figure 4:
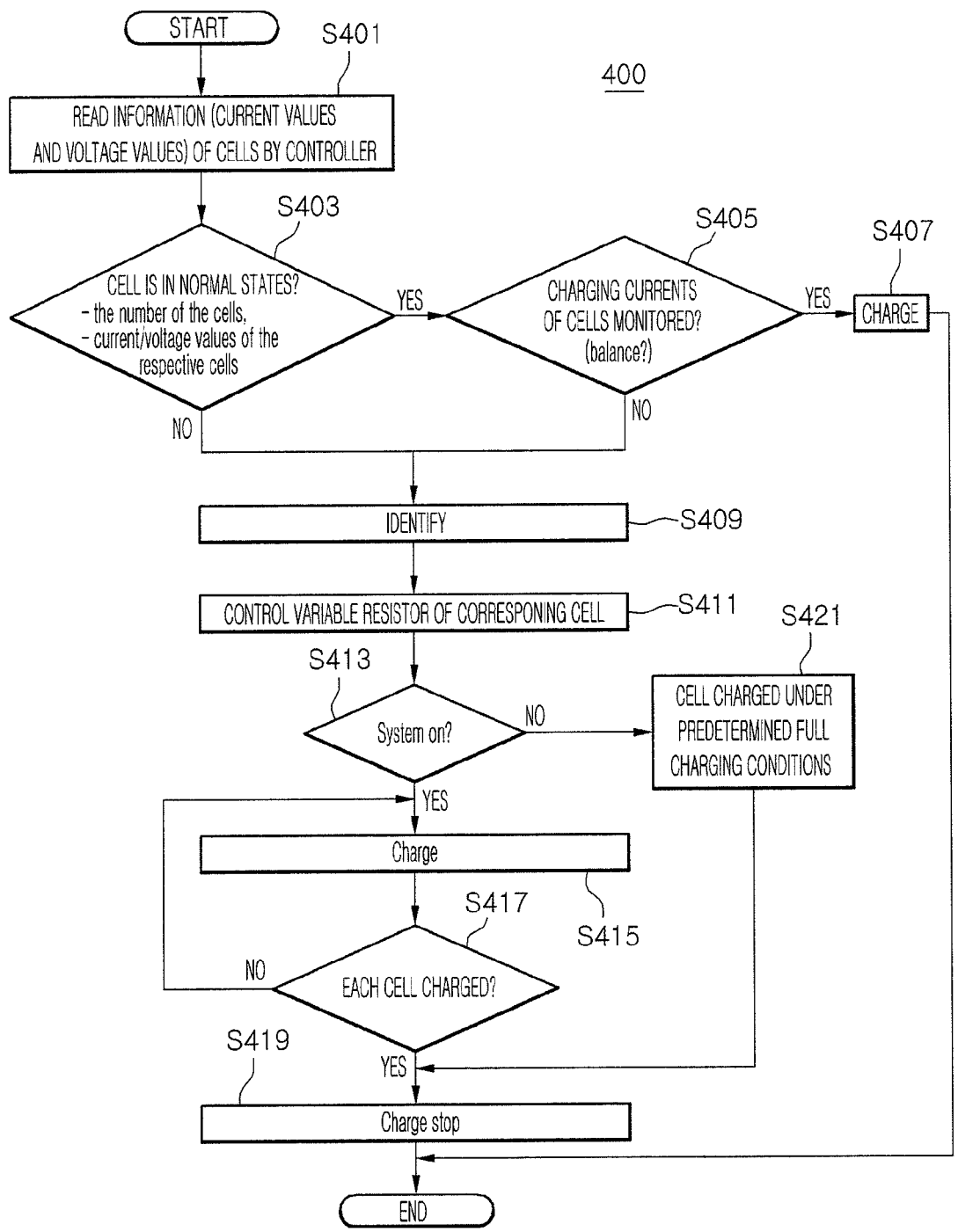
FIG. 4 is a flowchart illustrating a charging operation by a control of an impedance of each of power sources that are connected in parallel.

FIG. 4 is a flowchart illustrating a charging operation by a control of an impedance of each of power sources that are connected in parallel.

As shown in FIG. 4, the microcomputer that is the controller reads power source information such as the number of the cells, current values of the respective cells, voltage values of the respective cells (S401).

The microcomputer identifies states of the respective cells using the read information. When at least one of the cells is in a normal state (S403), the balance state of the charging currents of the respective cells is monitored (S405).

The controller identifies that the cells of the power source unit are in abnormal states or/and the charging currents are in abnormal states (unbalancing states) in accordance with the identification result (S409).

The controller controls the current balancing components coupled to the respective cells in accordance with the identification result (S411).

After the above, an identification operation of the system that operates by the power source unit including the cells and the charging operation through the respective current balancing components controlled are performed (S413, S415, S417, S419, and S421).

When the system is in an abnormal operation state, the charging operation is performed under the following charging conditions (S421).

Normal full charging conditions: 1) a battery voltage is 4.2±1%, 2) a taper current is less than 10% of the charging current. When these two conditions are satisfied, it is regarded that the cells are fully charged.

Meanwhile, when the charging currents of all of the cells are balanced, the charging operation is performed in accordance with the monitoring result of S405 (S407).

Figure 5:
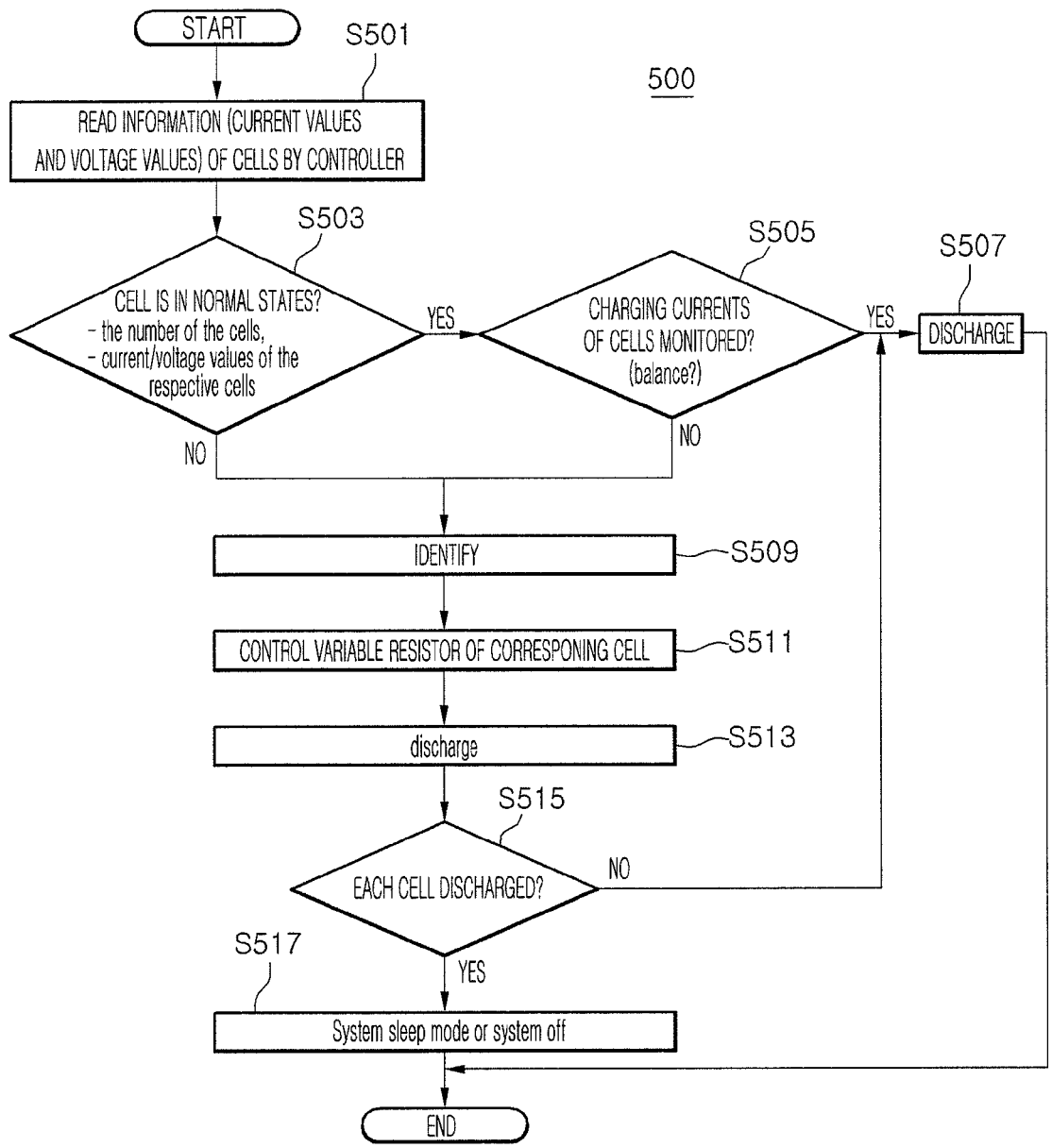
FIG. 5 is a flowchart illustrating a discharging operation by a control of an impedance of each of power sources that are connected in parallel.

FIG. 5 is a flowchart illustrating a discharging operation by a control of an impedance of each of power sources that are connected in parallel.

As shown in FIG. 5, the microcomputer that is the controller reads power source information such as the number of the cells, current values of the respective cells, voltage values of the respective cells (S501).

The microcomputer identifies states of the respective cells using the read information. When at least one of the cells is in a normal state (S503), the balance state of the discharging currents of the respective cells is monitored (S505).

The controller identifies that the cells of the power source unit are in abnormal states or/and the discharging currents are in abnormal states (unbalancing states) in accordance with the identification result (S509).

The controller controls the current balancing components coupled to the respective cells in accordance with the identification result (S511).

A discharging operation/an operation to a predetermined system state are performed through the controlled current balancing components (S513, 515, and 517).

Meanwhile, when all of the discharging currents are balanced, a discharging operation is performed in accordance with the monitoring result of S505 (S507). When all of the discharging currents of the cells are unbalanced, the discharging operation is not performed.

In the above, the identification operation if the all of the cells are in the normal states will be described hereinafter.

The apparatus is designed such that only the cells above 3.6V are discharged during the booting of the system.

Meanwhile, the apparatus is further designed such that only the cells having a normal system cut off voltage (3.1-3.5V) are discharged during the operation of the system.

Meanwhile, when there is something wrong with all of the cells, this is regarded as a discharge fail and the discharging operation is not performed.

In addition, the microcomputer recognizes the respective cells and monitors the charging/discharging currents of the respective cells. When it is monitored that the charging/discharging currents of the respective cells mismatch, the microcomputer controls the variable resistors to make the charging/discharging currents of the respective cells be balanced. During the charging/discharging operation, the microcomputer keeps monitoring the cells to identify if there is something wrong with the cells.

Meanwhile, when all of the cells are discharged to the system cut off voltage, the system changes to a sleep mode.

The above-described flowchart is exemplarily only and thus the order of the flowchart may be altered with a scope of the present disclosure.

Figure 6:
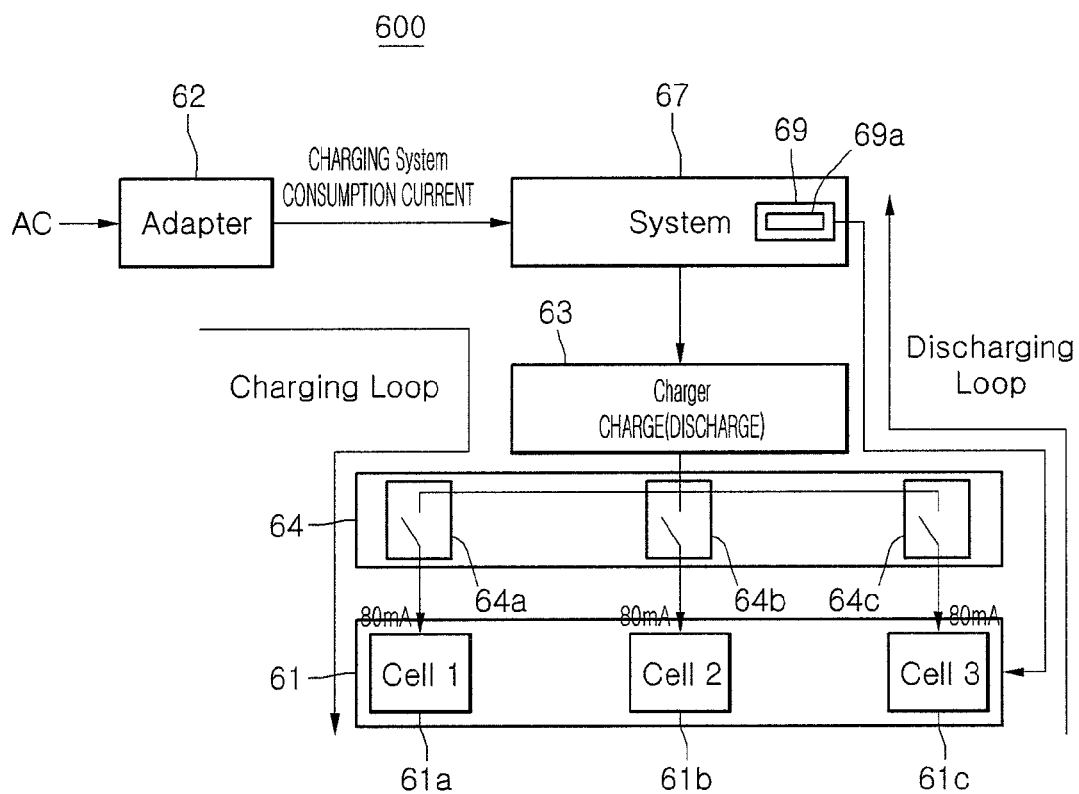
FIG. 6 is a block diagram illustrating a current control of each of power sources that are connected in parallel according to another embodiment.

FIG. 6 is a block diagram illustrating a current control of each of power sources that are connected in parallel according to another embodiment.

First, an outline of an operation of this embodiment will be described.

In order to solve the unbalance limitation of the charging/discharging currents of respective cells in a state where the cells are connected in parallel, switches for a PWM control are connected to the respective cells in series as an example of the current balancing components. An on/off duration time of each switch is controlled in accordance with an identification result of an amount of the charging/discharging currents of the respective cells or impedances of the respective cells by a controller so as to control duty cycles (100%, 87.5%, and 77.7%) of the PWM, thereby making the charging/discharging currents of the respective cell be balanced.

As shown in FIG. 6, an apparatus of this embodiment includes an adaptor 62 for converting an alternating current applied, a system 67, for example, a portable system such as a portable digital assistance to which an output current of the adaptor 62 is applied, a power source unit 61 having a plurality of cells 61a, 61b, and 61c and charged by a charger, and a current balancing unit 64 for making the charging/discharging currents of the respective cell be balanced in accordance with an identification result of an amount of the charging/discharging currents of the respective cells or impedances of the respective cells by a controller 69. The system 67 includes the current balancing unit 64 and the controller 69 for controlling the power source unit 61. The controller 69 includes a PWM controller 69a for controlling respective current balancing components (e.g., 64a, 64b, and 64c) of the current balancing unit in accordance with the identification result of the amount of the charging/discharging currents of the respective cells or the impedances of the respective cells.

Needless to say, the PWM controller may be provided at an outer side of the controller or the controller functions itself as the PWM controller.

According to this embodiment, an on/off duration times of the PWM duty switches 64a, 64b, and 64c are controlled in accordance with the identification result of the amount of the charging/discharging currents of the respective cells 61a, 61b, and 61c or the impedances of the respective cells by the controller 69 so as to control duty cycles (100%, 87.5%, and 77.7%) of the PWM, thereby making the charging/discharging currents of the respective cell be balanced.

Figure 7:
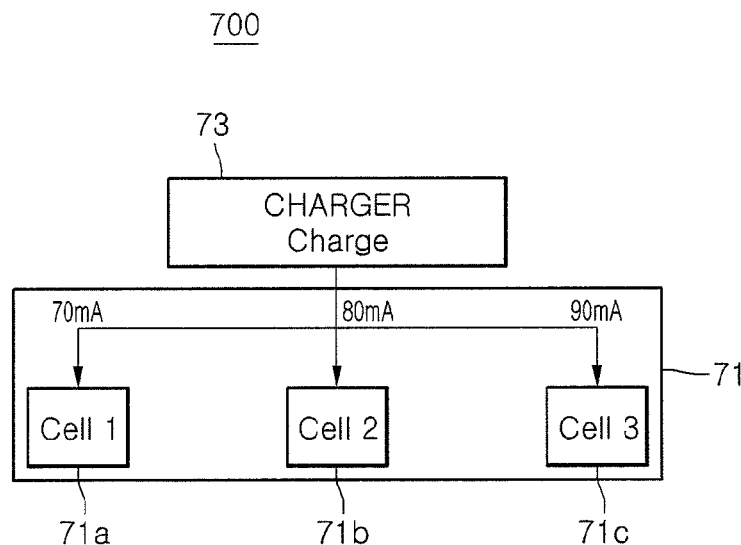
FIG. 7 is a block diagram illustrating a current charge in each of power sources of a power source unit without a control of a current balancing unit.

FIG. 7 is a block diagram 700 illustrating a current charge in each of power sources of a power source unit without a control of a current balancing unit (64 of FIG. 6).

As shown in FIG. 7, cells 71a, 71b, and 71c of a power source unit 71 are differently charged with currents by a charger 73.

when the currents are charged in the respective cells, a difference between charging currents of the respective cells is generated due to an impedance difference between the respective cells. For example, the cell 71a is charged with 70 mA, the cell 71b is charged with 80 mA, and the cell 71c is charged with 90 mA.

In the above description, although the charging currents are exemplarily explained, the discharging currents are also identically applied.

Figure 8:
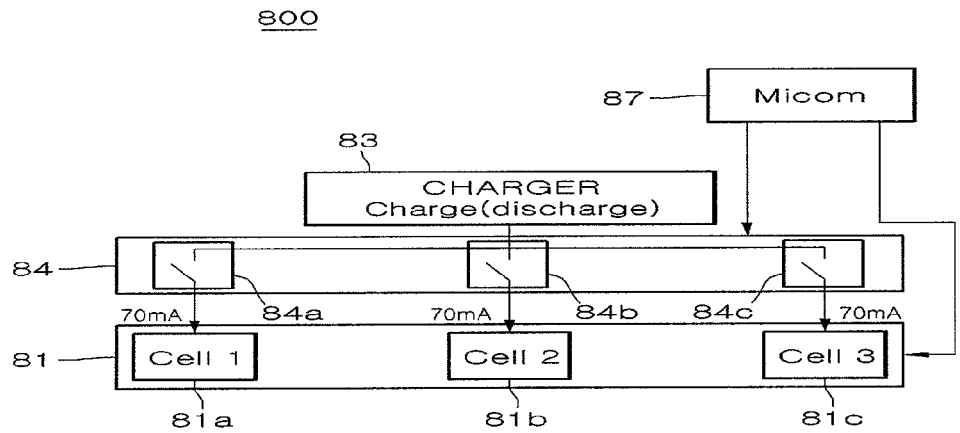
FIG. 8 is a block diagram illustrating a current charge in each of power sources of a power source unit through a control of a current balancing unit.

FIG. 8 is a block diagram 800 illustrating a current charge in each of power sources of a power source unit through a control of a current balancing unit 84.

An embodiment of FIG. 8 is similar to the embodiment of FIG. 7 except that a current balancing unit 84 is provided between a charger and a power source unit and a microcomputer 87 for controlling the current balancing unit and the power source unit 81 is provided.

Therefore, the controller controls PWM duty switches 84a, 84b, and 84c of the current balancing unit 84 in accordance with an identification result of an amount of the charging/discharging currents of respective cells 81a, 81b, and 81c of the power source unit to make the charging/discharging currents of the respective cell be balanced.

Figure 9A:
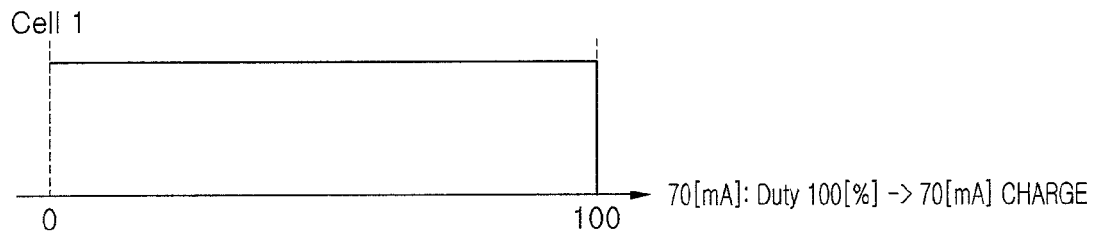
FIGS. 9a, 9b, and 9c are graphs illustrating current balancing between the power sources by a control of a pulse width that is activated through a control of each of PWM duty switches of the current balancing unit of FIG. 8.
Figure 9B:
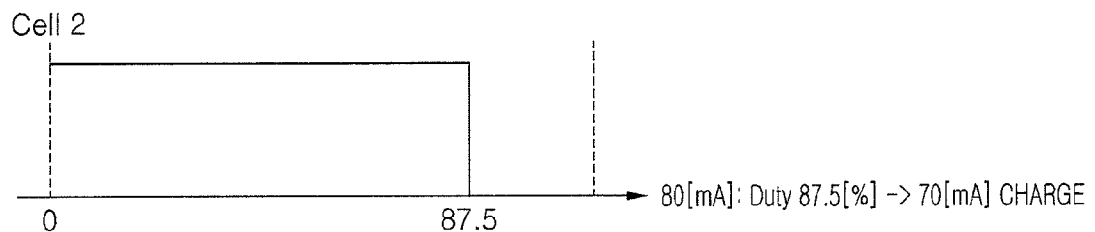
Figure 9C:
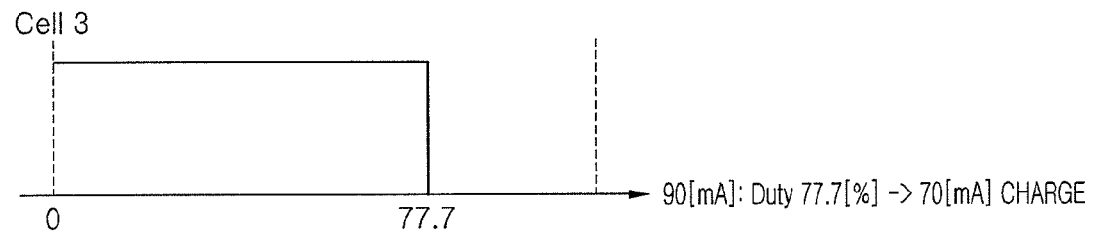

FIGS. 9a, 9b, and 9c are graphs illustrating current balancing between the power sources by a control of a pulse width that is activated through a control of each of the PWM duty switches 84a, 84b, and 84c of the current balancing unit 84 of FIG. 8.

As shown in FIG. 9a, in the cell 81a of FIG. 8, 100% of an original clock period of a waveform of applied power is applied as an on-duration time of the PWM switch 84a so that the duty cycle of the PWM is controlled to 100% and thus the cell 81b is charged with 70 mA.

As shown in FIG. 9b, in the cell 81b of FIG. 8, 87.5% of the original clock period of a waveform of applied power is applied as an on duration time of the PWM duty switch 84b so that the duty cycle of the PWM is controlled to 87.5% and thus the cell 81a is charged with 70 mA.

As shown in FIG. 9c, in the cell 81c of FIG. 8, 77.7% of the original clock period of a waveform of applied power is applied as an on duration time of the PWM duty switch 84c so that the duty cycle of the PWM is controlled to 77.7% and thus the cell 81c is charged with 70 mA.

As described above, by controlling the on/off duration times of the PWM duty switches, the PWM duty cycles (100%, 87.5%, and 77.7%) are controlled, thereby making the charging/discharging currents of the respective cell be balanced.

Meanwhile, when controlling the PWM duty cycles in the discharging operation of the cells that are connected in parallel, the PWN duty cycles are controlled such that at least one of the cells is discharged. That is, the PWM duty cycles are controlled such that the discharge of all of the cells that are connected in parallel is not turned off at a specific time point, thereby stably applying the current to the system.

Figure 10:
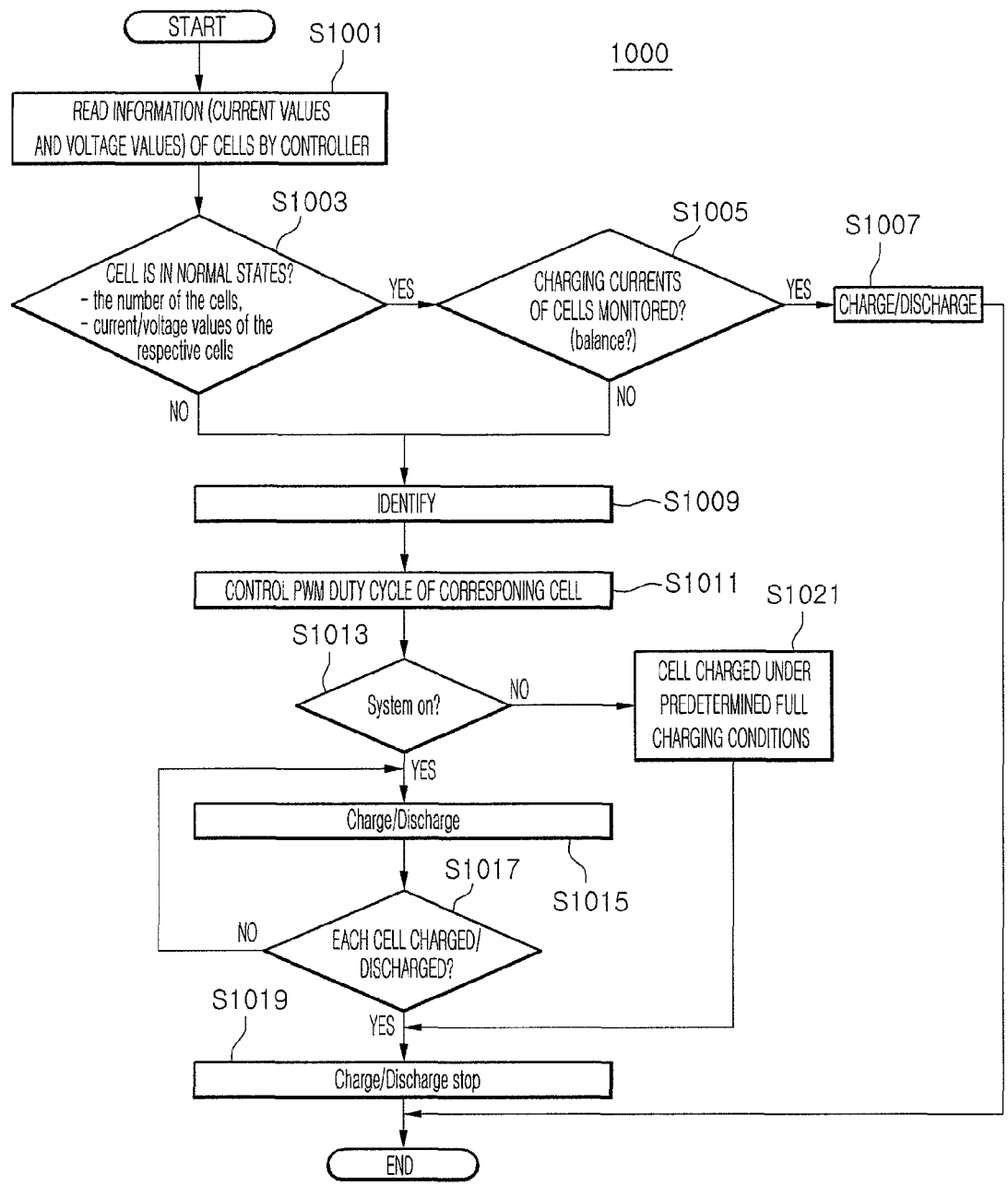
FIG. 10 is a flowchart according to another embodiment.

FIG. 10 is a flowchart according to another embodiment.

The flowchart 100 of FIG. 10 shows that an on/off duration times of the PWM duty switches 64a, 64b, and 64c are controlled in accordance with the identification result of the amount of the charging/discharging currents of the respective cells 61a, 61b, and 61c or the impedances of the respective cells by the controller 69 so as to control duty cycles (100%, 87.5%, and 77.7%) of the PWM, thereby making the charging/discharging currents of the respective cell be balanced.

In the operation of FIG. 10, all of operations except for operation S1011, in which an on/off duration times of the PWM duty switches 64a, 64b, and 64c are controlled in accordance with the identification result of the amount of the charging/discharging currents of the respective cells 61a, 61b, and 61c or the impedances of the respective cells by the controller 69 so as to control duty cycles (100%, 87.5%, and 77.7%) of the PWM, are substantially same as the operations of FIGS. 4 and 5 and thus a description thereof will be omitted herein.

Meanwhile, in the embodiments of FIGS. 4, 5, and 10, although the controller exemplarily controls the current balancing unit in accordance with the charging or discharging currents of the respective cells, the present disclosure is not limited to this configuration. For example, the controller may control the current balancing unit in accordance with the impedances of the respective cells.

As previously described, according to an apparatus and method for controlling power of the present disclosure, in order to make at least one of the charging currents or discharging currents of the respective cells match in a state where the cells are connected in parallel, the current balancing components such as the variable resistors are connected to the respective cells in series so that all of the impedances of the respective cells match with each other regardless of the properties of the cells.

In addition, the present disclosure relates to an apparatus and method for controlling power, which can control the power using the controller by connecting the variable resistors to the respective cells in series in order to making the impedances of the respective cells match with each other in a state where the cells are connected in parallel.

In addition, the present disclosure relates to an apparatus and method for controlling power, which can match the impedances by controlling the current balancing components such as the variable resistors connected to the respective cells considering the properties of the respective cells.

The matched impedance of the respective cells is the sum of the internal impedance of each of the cells and the impedance of each of the variable resistors.

According to the present disclosure, the current balancing unit is controlled in accordance with the monitoring result of the charging/discharging currents of the respective cells by the microcomputer so that the impedances of the respective cells match with each other, thereby uniformly controlling the charging/discharging currents.

Accordingly, it becomes possible to use the plurality of the cells that are connected in parallel and the PTC and temperature compensation circuit may be selectively omitted. Therefore, the production cost can be reduced.

In addition, since the cells are independently controlled, the functional deterioration caused by the loop path difference and cell impedance matching defect of the related art multi-cell can be prevented.

According to the above-described embodiments, the balancing of the charging/discharging currents of the respective cells in a state where the cells are connected in parallel by 1) matching the impedances of the respective cells through a control of the PWM duty cycles or the current balancing unit such as the variable resistors after identifying the charging or/and discharging currents of the respective cells connected in parallel or 2) controlling the cells such that the impedances of the cells match with each other using the current balancing unit after identifying the current impedances of the respective cells.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for controlling a power source, the apparatus comprising:
   a power source unit including a plurality of power cells connected in parallel;
   a balancing unit coupled to the plurality of power cells of the power source unit;
   a charging/discharging switch configured to perform a charging/discharging on/off of the plurality of power cells; and
   a controller configured to control the balancing unit to balance operational characteristics of the plurality of power cells, and to control the charging/discharging switch,
   wherein the controller is further configured to selectively allow only the power cells above a first voltage to discharge during an initial booting of a system receiving power provided from the power source unit, and to allow only the power cells from a second voltage to a third voltage to discharge during a normal operation of the system, and
   wherein each of the second voltage and the third voltage has a value below a value of the first voltage.

2. The apparatus of claim 1, wherein the controller controls the balancing unit such that the operational characteristics of the plurality of power cells substantially match one another.

3. The apparatus of claim 2, wherein the operational characteristics of the plurality of power cells includes currents charging the plurality of power cells and the controller controls the balancing unit to make the currents charging the plurality of power cells substantially match one another.

4. The apparatus of claim 2, wherein the operational characteristics of the plurality of power cells includes discharging currents discharging from the plurality of power cells and the controller controls the balancing unit to make the discharging currents discharging from the plurality of power cells substantially match one another.

5. The apparatus of claim 2, wherein the operational characteristics of the plurality of power cells include impedances of the plurality of power cells and the controller controls the balancing unit to make the impedances of the plurality of power cells substantially match one another.

6. The apparatus of claim 5, wherein a total impedance of a corresponding power cell is equal to an internal impedance of the corresponding power cell plus an external impedance of a corresponding balancing component included in the balancing unit.

7. The apparatus of claim 2, wherein the balancing unit includes a plurality of balancing components that are respectively connected to the plurality of power cells in series and in a one-to-one corresponding manner.

8. The apparatus of claim 7, wherein the plurality of balancing components are variable resistors and the controller controls the plurality of variable resistors such that the operational characteristics of the power cells match one another.

9. The apparatus of claim 7, wherein the plurality of balancing components are switches and the controller controls an on/off duration times of the plurality of switches such that the operational characteristics of the power cells match one another.

10. The apparatus of claim 1, further comprising:
    a main switch connected to the plurality of power cells and configured to switch on and off a connection of the plurality of power cells to the system receiving power from the plurality of power cells.

11. A method for controlling a power source, the method comprising:
    controlling a balancing unit coupled to a power source unit including a plurality of power cells connected in parallel so as to balance operational characteristics of the plurality of power cells, and a charging/discharging switch to perform a charging/discharging on/off of the plurality of power cells,
    wherein the controlling selectively allows only the power cells above a first voltage to discharge during an initial booting of a system receiving a power provided from the power source unit, and allows only the power cells from a second voltage to a third voltage to discharge during a normal operation of the system, and
    wherein each of the second voltage and third voltage has a value below a value of the first voltage.

12. The method of claim 11, wherein the controlling step controls the balancing unit such that the operational characteristics of the plurality of power cells substantially match one another.

13. The method of claim 12, wherein the operational characteristics of the plurality of power cells includes currents charging the plurality of power cells and the controlling step controls the balancing unit to make the currents charging the plurality of power cells substantially match one another.

14. The method of claim 12, wherein the operational characteristics of the plurality of power cells includes discharging currents discharging from the plurality of power cells and the controlling step controls the balancing unit to make the discharging currents discharging from the plurality of power cells substantially match one another.

15. The method of claim 12, wherein the operational characteristics of the plurality of power cells include impedances of the plurality of power cells and the controlling step controls the balancing unit to make the impedances of the plurality of power cells substantially match one another.

16. The method of claim 15, wherein a total impedance of a corresponding power cell is equal to an internal impedance of the corresponding power cell plus an external impedance of a corresponding balancing component included in the balancing unit.

17. The method of claim 12, wherein the balancing unit includes a plurality of balancing components that are respectively connected to the plurality of power cells in series and in a one-to-one corresponding manner.

18. The method of claim 17, wherein the plurality of balancing components are variable resistors and the controlling step controls the plurality of variable resistors such that the operational characteristics of the power cells match one another.

19. The method of claim 17, wherein the plurality of balancing components are switches and the controlling step controls an on/off duration times of the plurality of switches such that the operational characteristics of the power cells match one another.

20. The method of claim 11, further comprising:
switching on and off a connection of the plurality of power cells to the system receiving power from the plurality of power cells.

* * * * *